US011881366B2

(12) United States Patent
Carlson et al.

(10) Patent No.: US 11,881,366 B2
(45) Date of Patent: *Jan. 23, 2024

(54) SWITCH WITH ILLUMINATION SURFACE ILLUMINATED WITH DIFFERENT STATES OF ILLUMINATION

(71) Applicant: Banner Engineering Corporation, Minneapolis, MN (US)

(72) Inventors: Michael Scott Carlson, Deephaven, MN (US); Darrell Raymond Pikkaraine, Elk River, MN (US)

(73) Assignee: BANNER ENGINEERING CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,384

(22) Filed: Sep. 27, 2021

(65) Prior Publication Data

US 2022/0189709 A1 Jun. 16, 2022

Related U.S. Application Data

(63) Continuation of application No. 16/794,046, filed on Feb. 18, 2020, now Pat. No. 11,139,124, which is a (Continued)

(51) Int. Cl.
*H01H 3/02* (2006.01)
*H01H 13/02* (2006.01)
(Continued)

(52) U.S. Cl.
CPC ............ *H01H 3/022* (2013.01); *H01H 9/161* (2013.01); *H01H 13/023* (2013.01); *H05B 47/10* (2020.01)

(58) Field of Classification Search
CPC ...... H01H 3/022; H01H 9/161; H01H 13/023; H05B 47/10
See application file for complete search history.

(56) References Cited

U.S. PATENT DOCUMENTS 3,170,057 A 2/1965 Kane
4,583,151 A * 4/1986 Nagel .................... G05G 1/105
362/333

(Continued)

FOREIGN PATENT DOCUMENTS

EP 0417048 A2 * 3/1991
JP 2010-176873 A 8/2010

OTHER PUBLICATIONS

Eaton Corp., "M22 Twist-to-Release, Mushroom Head Emergency-Stop Pushbuttons", Feb. 2011, 2 Pages.

(Continued)

*Primary Examiner* — Jennifer D Bennett
(74) *Attorney, Agent, or Firm* — Merchant & Gould P.C.

(57) ABSTRACT

A switch is disclosed. In some examples, a switch includes a generally cylindrical housing; one or more sets of contact points enclosed by the housing; an indicator module, such as a multi-color LED illuminator, also enclosed by the housing; and a pushbutton actuator disposed to operate the contact points. The housing includes a display section spanning substantially the entire circumference of the housing such that the indication made by the indicator module is visible from all radial directions. When the pushbutton actuator is pressed, some of the contact points open to cut off power from hazards, while others are reconfigured to change the state of the indicator module to indicate the changed status of the switch. Multiple switches can be interfaced with each other, such as by serial connection, to facilitate multi-switch
(Continued)

safety environment. Modular cables can be used to conveniently establish the interface.

20 Claims, 11 Drawing Sheets

Related U.S. Application Data continuation of application No. 14/168,845, filed on Jan. 30, 2014, now Pat. No. 10,566,148.

(60) Provisional application No. 61/849,655, filed on Jan. 30, 2013.

(51) Int. Cl.
*H01H 9/16* (2006.01)
*H05B 47/10* (2020.01)

(56) References Cited

U.S. PATENT DOCUMENTS

| | | | |
|---|---|---|---|
| 6,198,058 | B1 | 3/2001 | Graninger et al. |
| 7,205,495 | B2 | 4/2007 | Mazur |
| 7,671,851 | B1 | 3/2010 | Pryor |
| 8,242,397 | B2 | 8/2012 | Fu |
| 10,566,148 | B2 | 2/2020 | Carlson et al. |
| 11,139,124 | B2 | 10/2021 | Carlson et al. |
| 2002/0071279 | A1 | 6/2002 | Katogi et al. |
| 2002/0079208 | A1 | 6/2002 | Campana et al. |
| 2008/0068823 | A1 | 3/2008 | Lim |
| 2010/0170276 | A1 | 7/2010 | Kang et al. |
| 2010/0243418 | A1 | 9/2010 | Machida et al. |
| 2011/0235313 | A1 | 9/2011 | Canella |

OTHER PUBLICATIONS

Schlegel Elektrokontakt, "Design Awards," printed from https://www.schlegel.biz/web/en/design/designauszeichnungen.php., Sep. 18, 2019, 6 Pages.

Siemens AG, Product information on illuminated back plate for emergency-stop (3SB3921-0DA), printed from https://support.industry.siemens.com/cs/pd/327173?pdti=pi&dl=en&pnid=16590&lc=en-WW, Sep. 18, 2019, 3 Pages.

* cited by examiner

SWITCH WITH ILLUMINATION SURFACE ILLUMINATED WITH DIFFERENT STATES OF ILLUMINATION

CROSS REFERENCE TO RELATED APPLICATIONS

This application is a continuation of U.S. application Ser. No. 16/794,046, filed Feb. 18, 2020, now U.S. Pat. No. 11,139,124, which is a continuation of U.S. application Ser. No. 14/168,845, filed Jan. 30, 2014, now U.S. Pat. No. 10,566,148, which claims the benefit of U.S. Provisional Applications Ser. No. 61/849,655, filed Jan. 30, 2013. The U.S. Provisional Applications Ser. No. 61/849,655 and the identified continuation applications are incorporated herein by reference in their entirety.

BACKGROUND

This disclosure relates generally to devices, such as an "emergency stop" device, which perform a machine function that is manually initiated during urgent situations that results in immediate or controlled cessation of machine motion or other hazardous situations.

In certain settings, quick, unobstructed access by personnel to emergency stop devices is required on all operator stations and other locations as determined by a risk assessment. Actuating an emergency stop device can remove all energy sources to hazards and overrides all other functions and operations in all modes.

An "emergency stop" device can take many forms, but typically is a pushbutton-operated device that is actuated by a single human action.

The present disclosure relates to pushbutton-operated emergency-stop device that is designed to facilitate high visibility, easy access and convenient safety system configuration.

SUMMARY

The present disclosure relates to a pushbutton-operated switch. In some configurations, a switch according to the present disclosure includes a generally cylindrical housing; one or more sets of contact points enclosed by the housing; an indicator module, such as a multi-color LED illuminator, also enclosed by the housing; and a pushbutton actuator disposed to operate the contact points. The housing includes a display section spanning substantially the entire circumference of the housing such that the indication made by the indicator module is visible from all radial directions. When the pushbutton actuator is pressed, some of the contact points open to cut off power from hazards, while others are reconfigured to change the state of the indicator module (e.g., change from yellow light to flashing red light) to indicate the changed status of the switch.

According to some aspects of the disclosure, multiple switches can be interfaced with each other, such as by serial connection, to facilitate multi-switch safety environment. Modular cables can be used to conveniently establish the interface.

DETAILED DESCRIPTION

Figure 1:
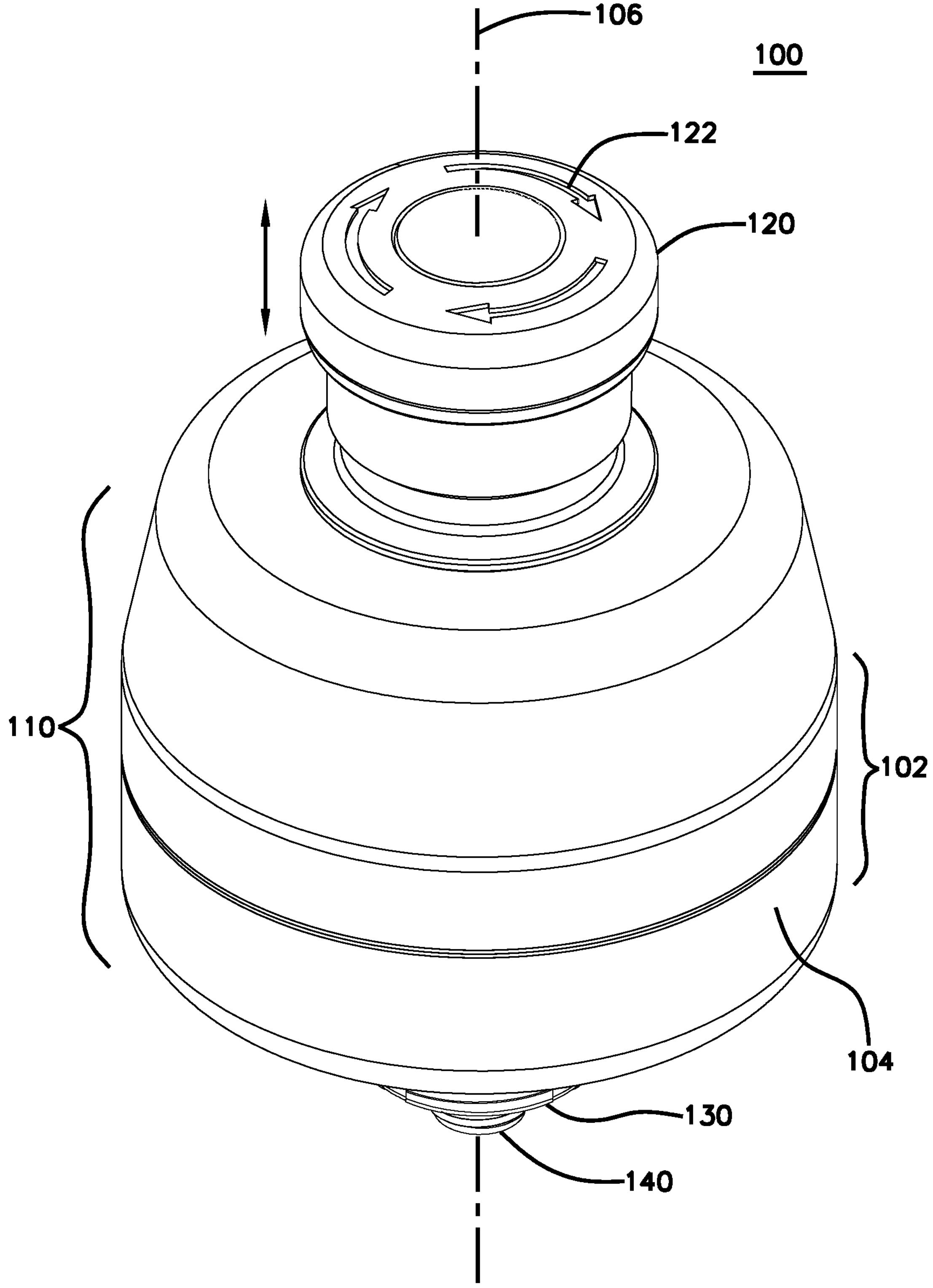
FIG. 1 shows a perspective view of a switch according to one aspect of the present disclosure.

In certain settings, quick, unobstructed access by personnel to emergency stop devices is required on all operator stations and other locations as determined by a risk assessment. Actuating an emergency stop device can remove all energy sources to hazards and overrides all other functions and operations in all modes Under certain regulations, pushbutton-type device for emergency stop devices must be colored RED. The background immediately around pushbutton must be colored YELLOW. Emergency stop device must be continuously operable, clearly identified, clearly visible and readily accessible. The color RED for the emergency stop actuator cannot depend on illumination of the actuator (button).

Many pushbutton-type devices are mounted on control panels/enclosures at operator stations, but a significant number of pushbutton-type devices are also located remotely and require individual enclosures that house the pushbutton-type device and possibly other control and indicating devices. These remote, or stand-alone, enclosures are typically rectangular or square "boxes" that are constructed of metal or plastic.

In many applications, there are several individual pushbutton-type devices that are located in various positions on a machine (see, e.g., ANSI B11.19) or integrated manufacturing system (see, e.g., ANSI B11.20). In situations that require the actuation of the emergency stop function, typically a single pushbutton-type emergency-stop device is depressed. Once the situation is addressed, there may be difficulty in identifying the pushbutton-type device that was actuated (depressed) such that it can be reset allowing the machine or system to be placed in to operation.

Currently, there are two methods to identify an actuated pushbutton-type device other than the physical position of the button. These are a colored ring, typically GREEN, on the shaft of the button, or a RED colored indicator located in the face of the button that will illuminate either when the button is depressed or armed, depending on the installation.

The devices and methods according to some aspects of the present disclosure facilitate high visibility, easy access and convenient safety system configuration.

An exemplary pushbutton-type device includes illumination logic intended for quick identification of the status (armed or actuated) of the individual emergency stop button and optional indication of a machine or system stop.

When the button is armed, the housing (base) is illuminated yellow for high visibility while complying with the required yellow background requirement of an emergency stop indication. Once the button is actuated (depressed), the housing (base) will flash red to indicate the depressed button. This flashing red indication is unique in a standalone pushbutton-type device (i.e. no external signal or logic to create the flash sequence).

The illumination feature of the pushbutton-type device according to certain aspects of the present disclosure enhances the ability to comply with the requirements to clearly identify emergency stop pushbutton device and for it to be clearly visible. The user also has the option to have the housing (base) of an armed button to turn a steady red indication (from yellow) when a STOP condition exists by applying an external signal.

Figure 2:
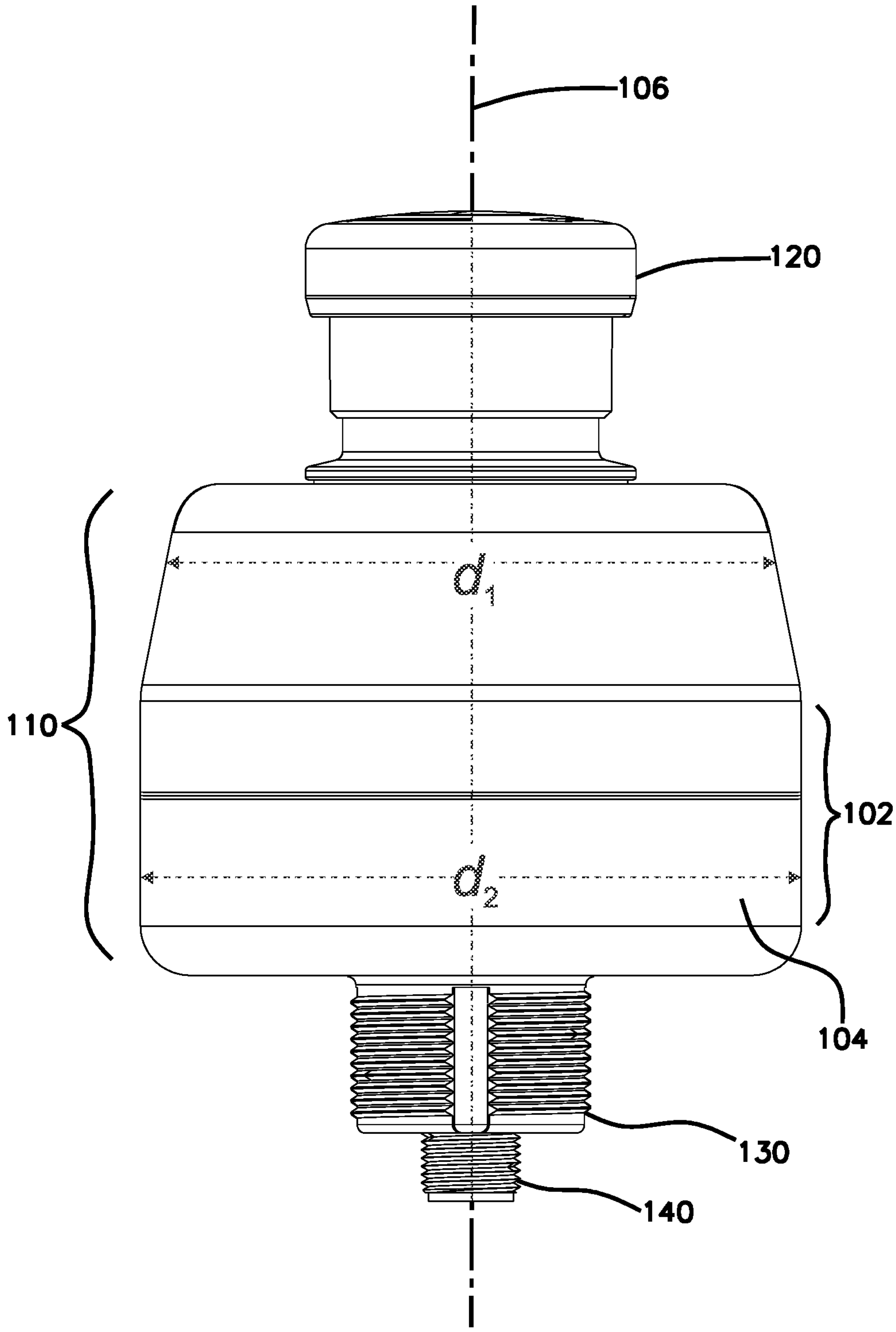
FIG. 2 shows a side view of the switch shown in FIG. 1.
Figure 3:
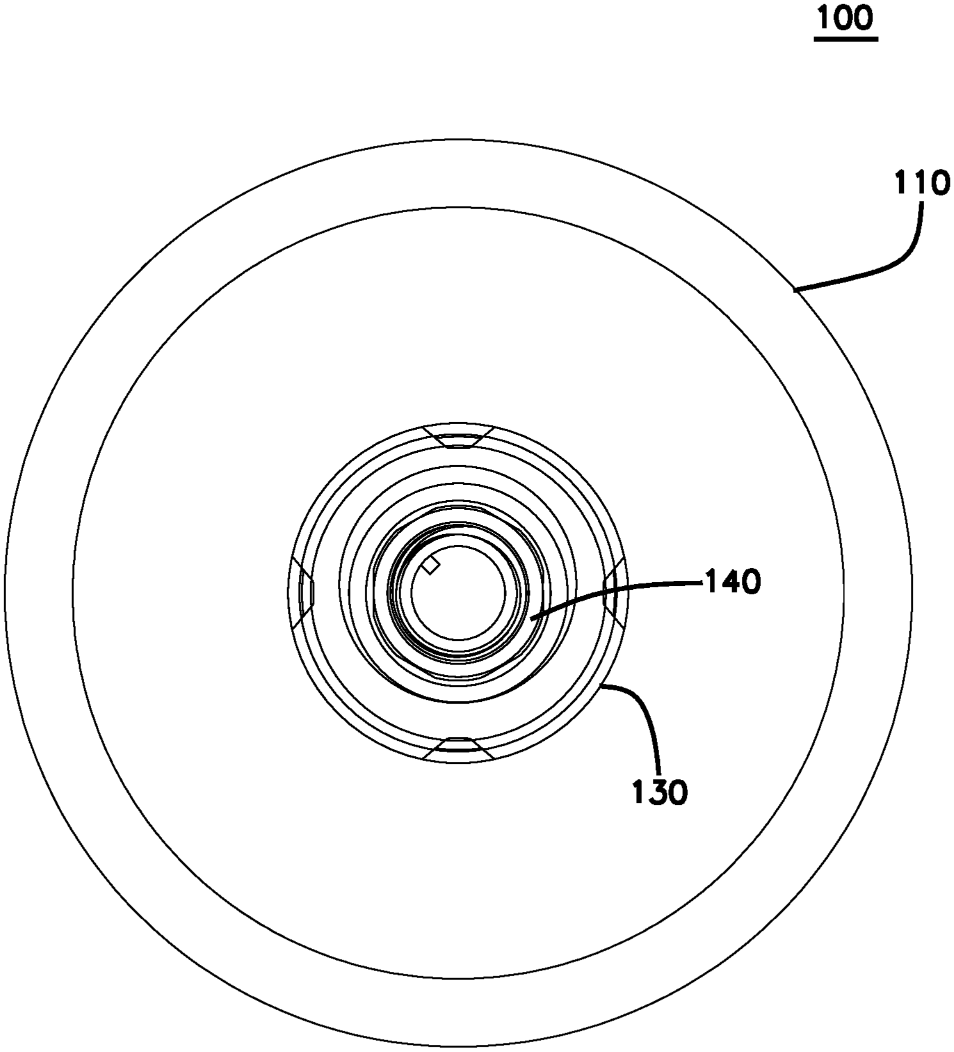
FIG. 3 shows a bottom view of the switch shown in FIG. 1.

FIGS. 1-3 show a switch (100) according to one aspect of the present disclosure. FIG. 1 shows a perspective view of the switch (100); FIG. 2 shows a side view of the switch (100); and FIG. 3 shows a bottom view of the switch (100). The switch (100) in this example includes a housing (110) comprising a substantially rounded cylindrical wall section (102), which in some examples includes a light transmitting section (104). In some embodiments, as illustrated in FIG. 2, the housing (110) includes sections of different lateral dimensions. For example, the sidewall of the upper portion of the housing (110) includes a frustoconical section having a varying lateral dimension $d_1$, the sidewall of the lower portion of the housing (110), i.e., the substantially rounded cylindrical wall section (102), has a lateral dimension $d_2$. The switch (100) includes an electrical circuit (not shown in FIGS. 1-3) enclosed in the housing (110); the electrical circuit includes a pair of electrical contacts and an illuminating device. The switch (100) further includes an actuator, which in this example is a push button (120), which can be manually moved to open and close the pair of electrical contacts. The illuminating device is configured to be set to different states of illumination, such as on, off, steady, flashing and/or different colors, at least in part depending on the operation of the actuator (120) and is adapted to illuminate at least about a 50% circumferential portion of the light transmitting section (104). In the example shown in FIGS. 1-3, the illuminating device is adapted to illuminate circumferentially the entire light transmitting section (104).

Figure 4:
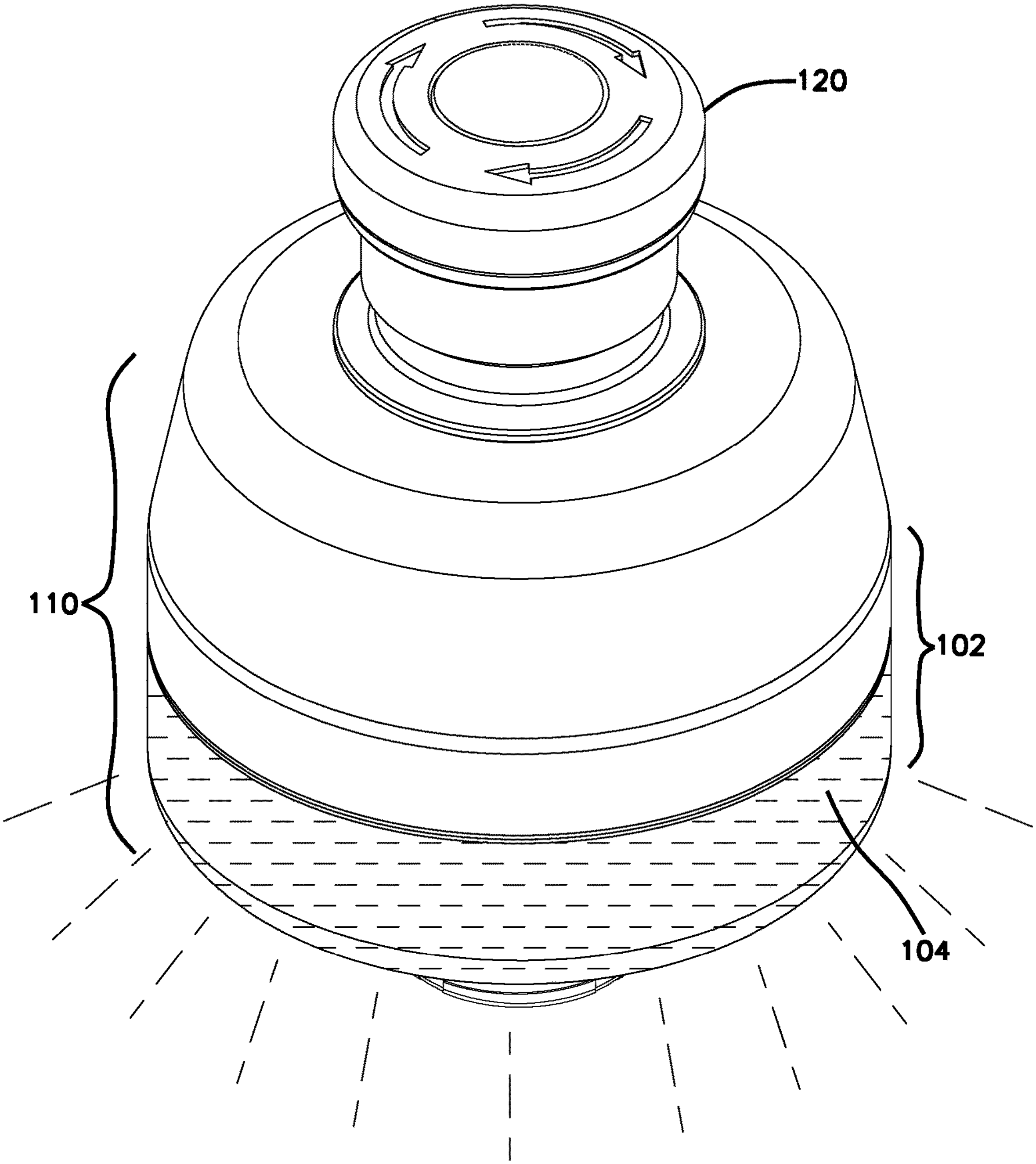
FIG. 4 illustrates a switch according to one aspect of the present disclosure with its illumination indicator indicating (e.g., by yellow light) that the switch is in its armed state.
Figure 5:
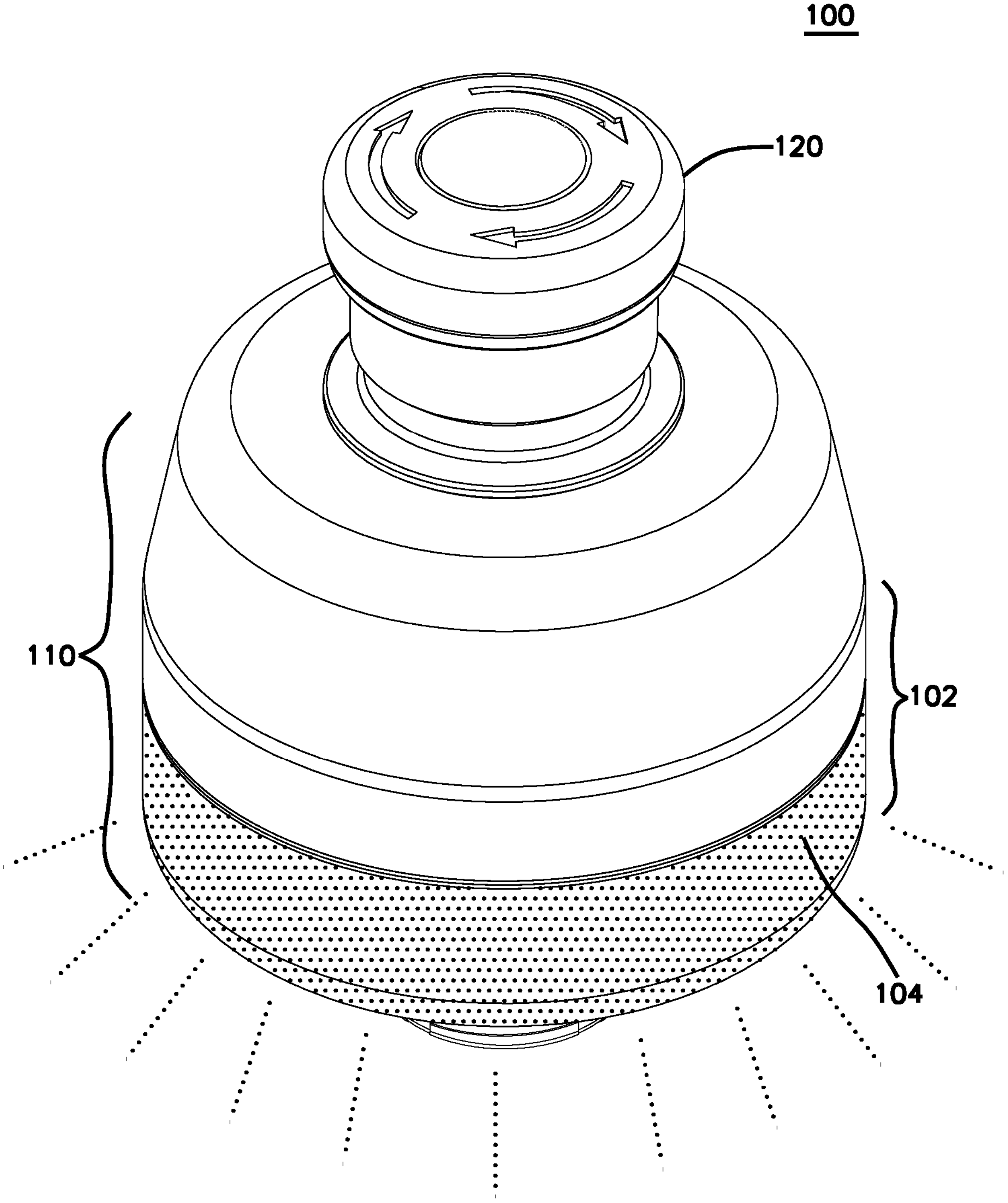
FIG. 5 illustrates a switch according to one aspect of the present disclosure with its illumination indicator indicating (e.g., by flashing red light) that the pushbutton of switch has been pressed.
Figure 6:
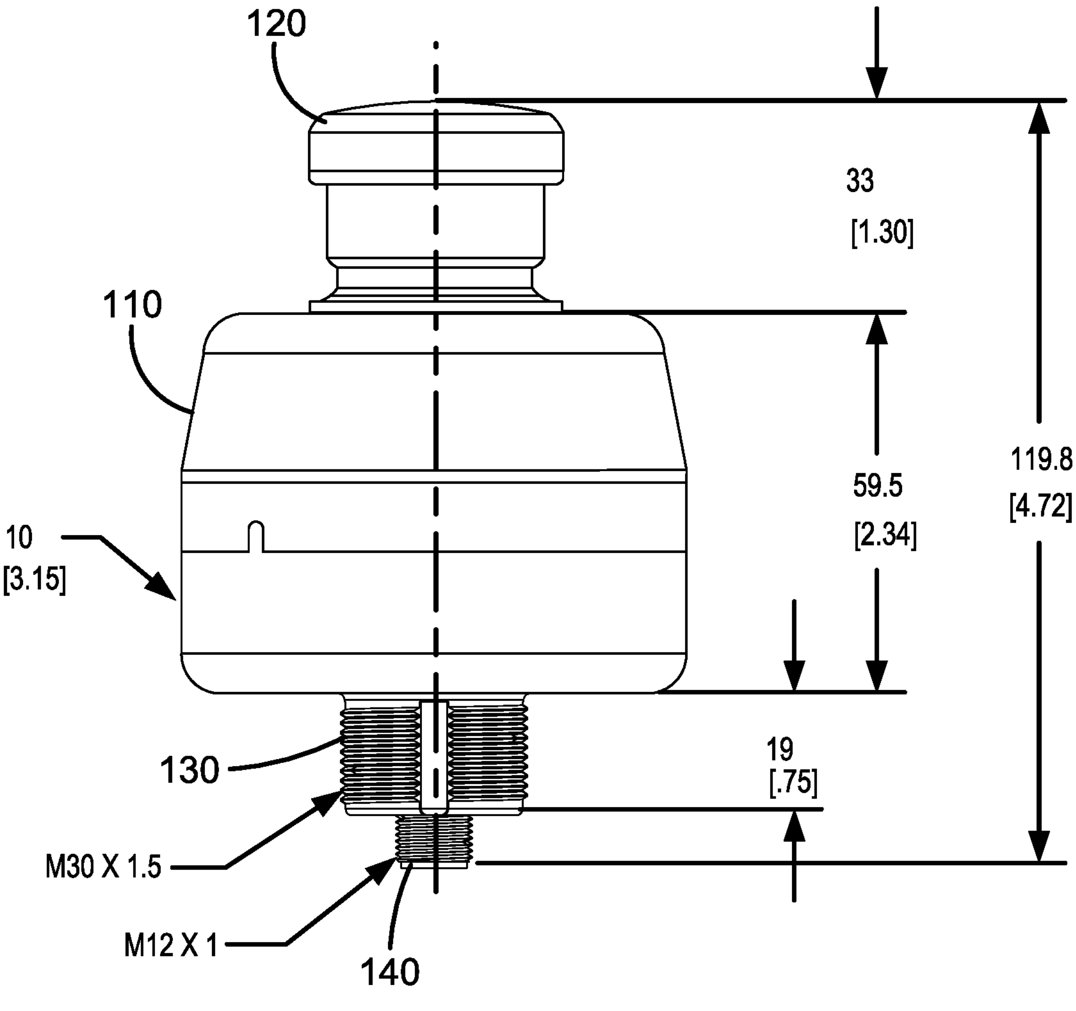
FIG. 6 shows a side view of a switch of the type shown in FIG. 1, with dimensions in one specific example according to this disclosure.

The actuator in this example is configured to be manually moved relative to the housing (110) in at least two ways: linearly along the direction of an axis (106) of the housing (110) and in a twisting motion, as indicted by the directional indicia, in this example arrows (122) marked on the pushbutton (120), about the axis (106). Manual movements of the pushbutton (120) in this example sets the switch (100) in at least two different states: an armed state and an actuated state, which are explained in more detail below. For example, as illustrated in FIG. 4, positioning the pushbutton (120) farthest from the housing (110) sets the switch (100) in the armed state, in which the illuminating device in the electrical circuit emits light of one state of illumination (e.g., steady yellow) through the light transmitting section (104), indicating the armed state. Pressing the pushbutton (120) toward the housing (110) sets the switch (100) in the actuated state, in which the illuminating device in the electrical circuit emits light of another state of illumination (e.g., flashing red) through the light transmitting section (104), indicating the actuated state, as illustrated in FIG. 5. Once a pushbutton (120) is actuated (pressed), it is latched in the actuated position. Thereafter, a twist of the pushbutton (120) releases it back to the armed position.

The switch in some examples, such as the ones illustrated in FIGS. 1-3 and 6, further includes a mounting portion, such as a threaded mounting base or hub (130) protruding from the bottom of the housing (110) for securing the switch (100) to a suitable structure, such as a mounting bracket with a hole that accommodates the mounting base (130). The mounting base (130) in some embodiment have a sufficient size to ensure a robust support for the switch (100). In the particular example shown in FIG. 6, the threaded mounting base (130) is 30 mm in diameter, but a mounting base of any other suitable size can be used.

Figure 7:
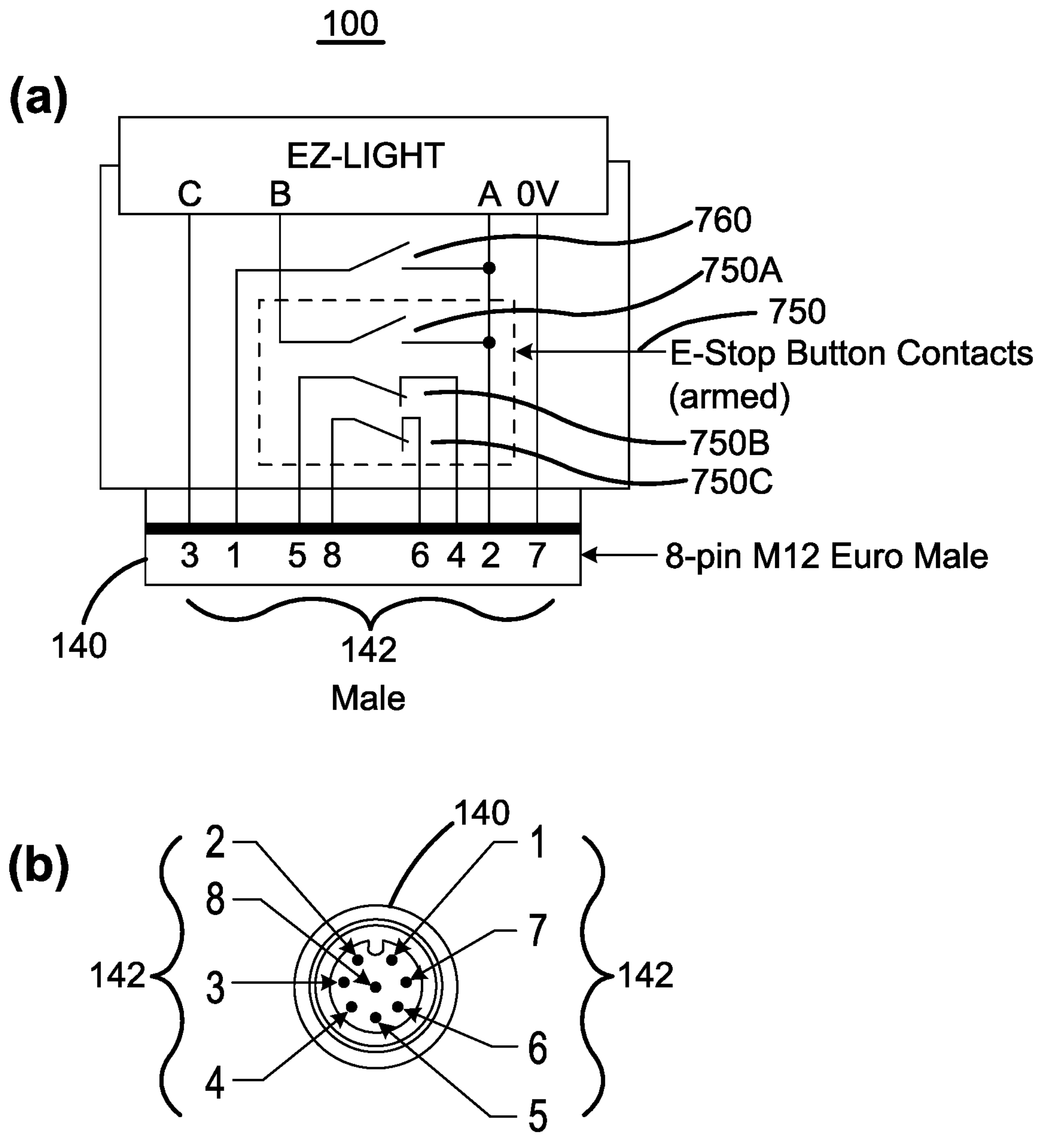
FIG. 7 shows a schematic diagram of the electrical configuration in a switch according to an aspect of the disclosure.

As further illustrated in FIGS. 1-3 and 6, the switch (100) also includes a connector 140 for attaching an electrical cable to the housing (110), thereby connecting the electrical circuit in the switch (100) to external circuits. Any suitable connector can be used. In the example in FIG. 6, an M12 Euro-style Quick Disconnect connector is used. As shown in FIG. 7(*b*), the connector in this example has eight electrodes (pins or sockets) (142-1 through 142-8). However, any suitable connector can be used.

FIG. 7(*a*) shows a schematic diagram of the electrical configuration in a switch (100) according to an aspect of the disclosure. The electrodes (142-1 through 142-8) of the connector (140) connects the electrical circuit in the switch (100). The connections to the electrodes in one example are as follows (including color codes for the wires):

| Pin | Color | Function |
|---|---|---|
| 1 | White | AUX NO Output (Switched pin 2) |
| 2 | Brown | +24 V dc (12-30 V dc) |
| 3 | Green | Stop Signal input from safety module or machine +24 V dc (12-30 V dc) |
| 4 | Yellow | CH2a |
| 5 | Gray | CH2b |
| 6 | Pink | CH1a |
| 7 | Blue | 0 V dc |
| 8 | Red | CH1b |

The electrical circuit includes an illuminating device (108), which is configured to generating light of different illumination states depending on the inputs A, B and C. The electrical circuit in this example further includes pairs of electrical contacts (750), which include contacts 750A, 750B and 750C; and electrical contacts (760). Contacts 750A and 760 are normally-open ("NO") contacts, which are open when the switch (100) is in the armed state and closed in the actuated state; contact 750B and 760C are normally-closed ("NC") contacts, which are closed when the switch (100) is in the armed state and open in the actuated state.

The contacts 750B and 750C are connected to external control circuitry, and cut off the connection between electrodes 4 and 5, and between 6 and 8, respectively, when the pushbutton (120) is actuated. Contacts 750A connects input B of the illuminating device (108) to the power supply (24V dc), thereby causing the illumination state to change to flashing red. The illumination state when the switch (100) is armed depends on the voltage at electrode 142-3 (or input C) as follows:

| Situation | Indication* | Illumination Logic |
|---|---|---|
| Button Armed Pin 3 open | YELLOW/ STEADY | Indicates button is armed and machine is enabled to run or is running |
| Button Pushed Pin 3 open | RED/FLASH | Indicates the button that is pushed (actuated) and the machine is in an Emergency Stop condition |
| Button Pushed Pin 3 = +24 Vdc | RED/FLASH | Indicates the button that is pushed (actuated) and the machine is in an Emergency Stop condition<br>Signal on Pin 3 has no effect on a button that has been pushed (actuated) |
| Button Armed Pin 3 = +24 Vdc | RED/STEADY | Indicates the machine is in an Emergency Stop or other stop condition, but that specific button has not been pushed (actuated)<br>This optional signal (+24 Vdc) allows the user to indicate an Emergency Stop or a normal stop condition by turning the YELLOW (steady) to a RED (steady) indication |

Figure 8:
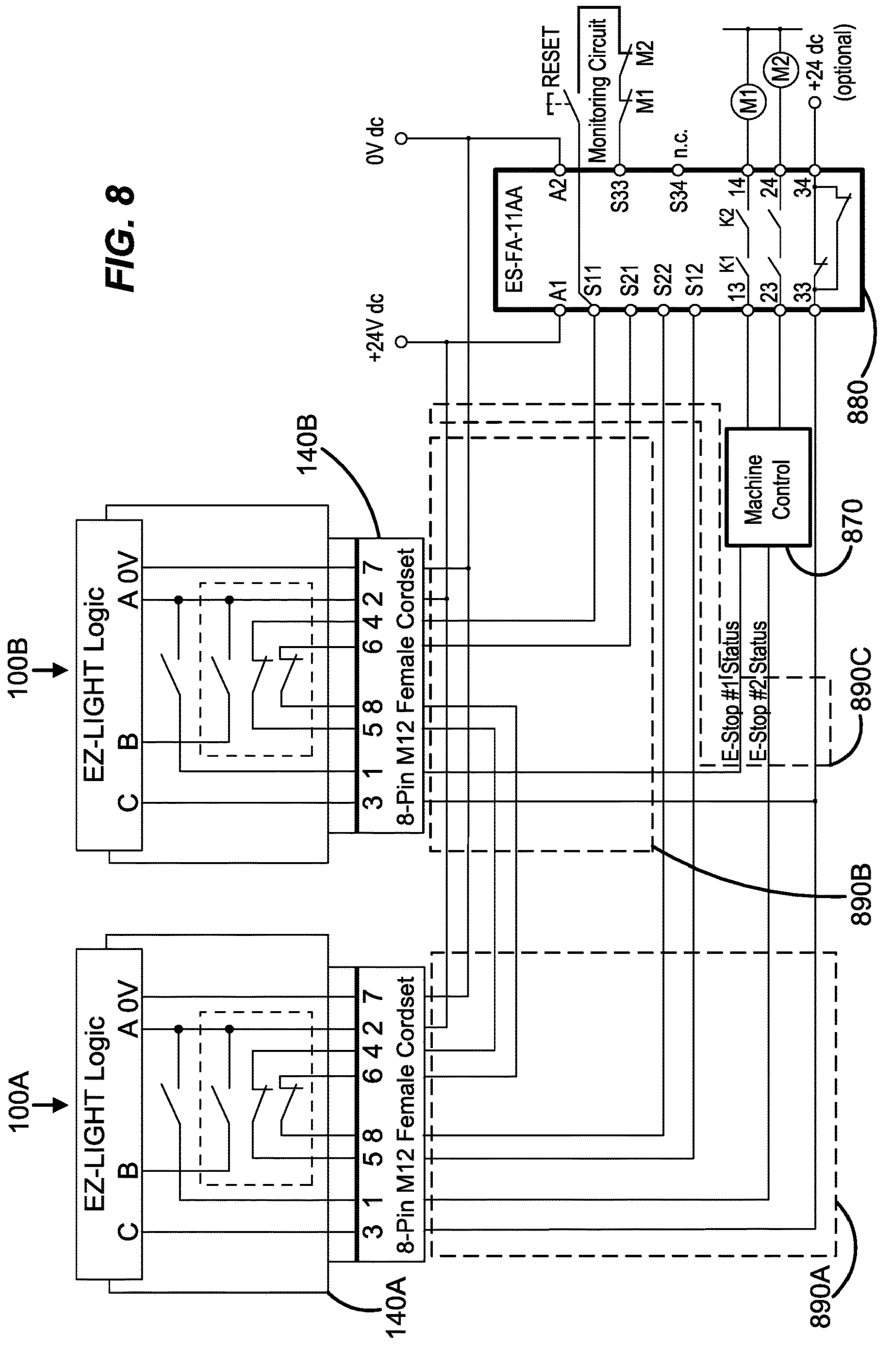
FIG. 8 schematically shows connection of two switches according to an aspect of the disclosure connected to an external device, such as a safety module, according to another aspect of the disclosure.

FIG. 8 schematically shows connection of two switches (100A, 100B) according to an aspect of the disclosure connected to an external device, such as a safety module, according to another aspect of the disclosure. Multi-wire cables (890A, 890B) connect the connector (140A) of the switch (100A) to the connector (140B) of the switch (100B); another multi-wire cable (890C), in turn, connects the connector (140B) of switch (100B) to an external circuitry (880), which monitors the states of the contacts opened or closed by the pushbuttons (120) in the respective switches (100A and 100B). In this example, the outputs at electrodes 142-1 of the NO switches 760A and 760B in the switches (100A and 100B) are connected to a machine control (870). When either switch (100A or 100B) is actuated, the respective contact (760A or 760B) closes, and electrode 142-1 outputs a voltage (in this example 24 Vdc) applied to the corresponding electrode 142-2. The machine control (870), in response, produces an output that is applied to the external circuitry (880).

Figure 9:
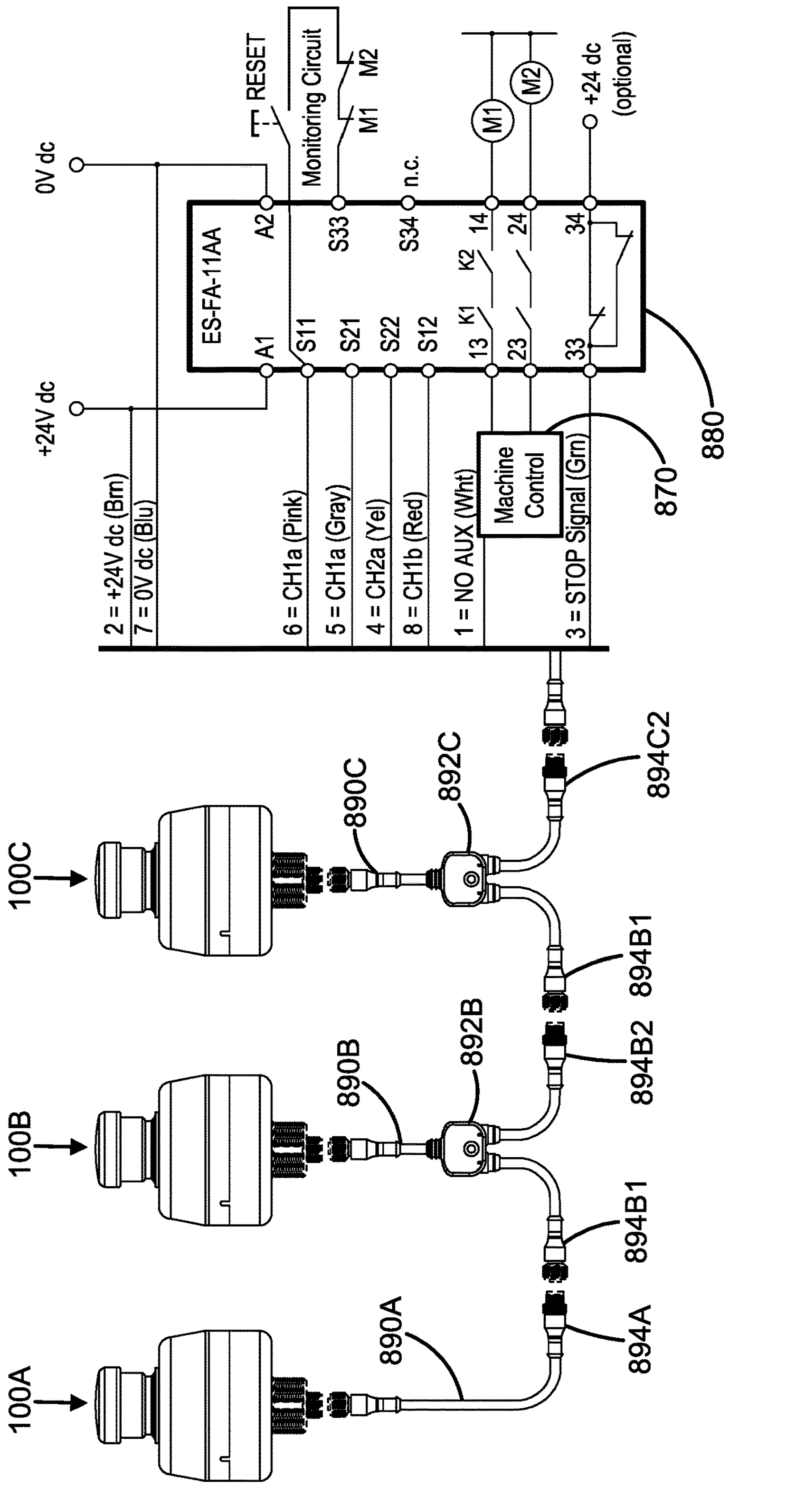
FIG. 9 schematically shows connection of multiple switches according to an aspect of the disclosure connected to an external device, such as a safety module, via modular cables according to another aspect of the disclosure.
Figure 10:
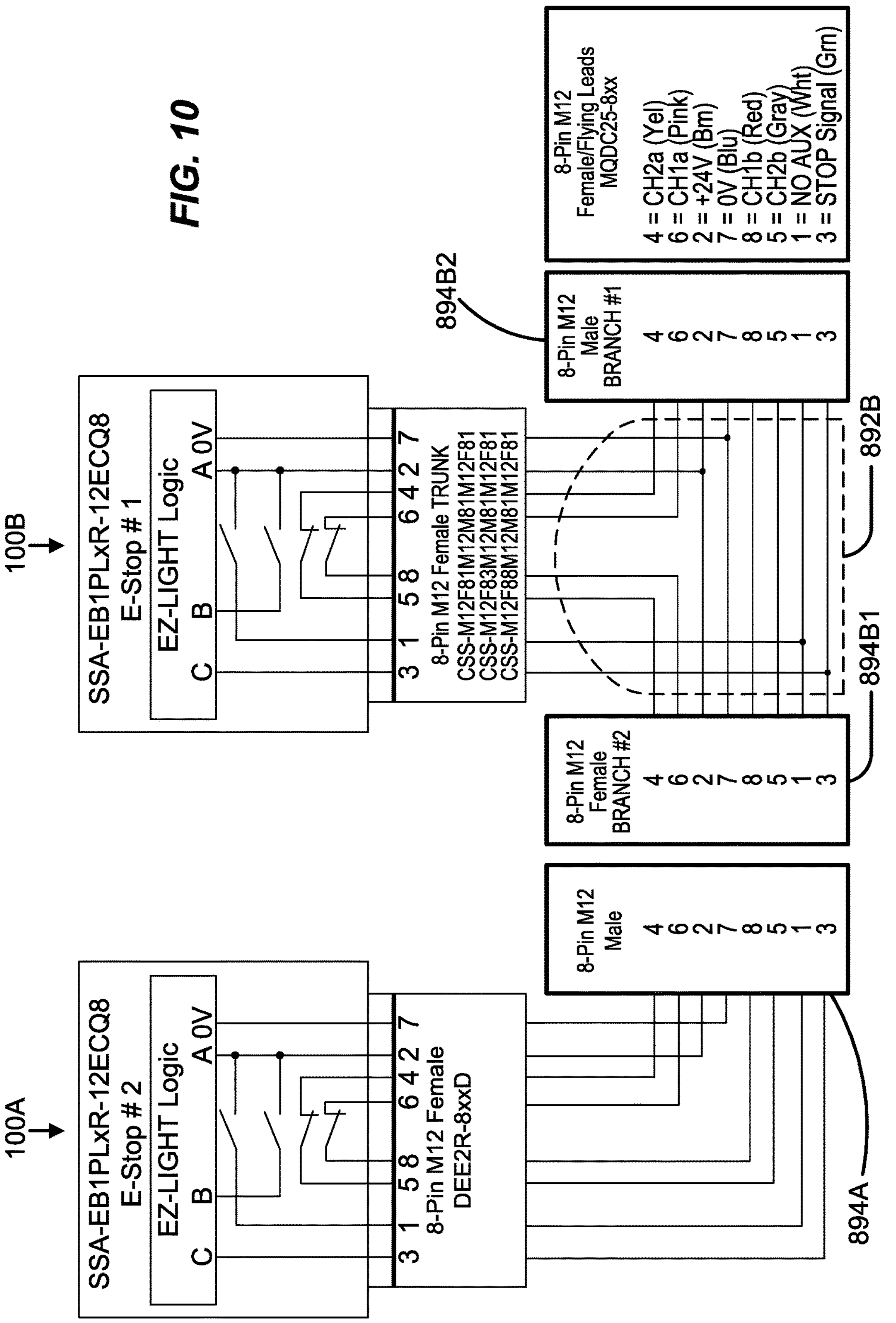
FIG. 10 schematically shows modular cables according an aspect of the disclosure and their connections to switches according to another aspect of the disclosure.

More than two switches can be interconnected according to certain aspects of the present disclosure. FIG. 9 schematically shows connection of three switches (100A, 100B and 100C) according to an aspect of the disclosure connected to an external device, such as a safety module, via modular cables (890A, 890B and 890C) according to another aspect of the disclosure. Modular cables can be single cables, such as the cable 890A, with connectors at two ends; modular cables can also be splitter-type cables, such as the cable 890B and 890C, each of which has a splitter (892B or 892C, respectively) and three connectors, one for the trunk, and one for each split branch. The connectors at the ends of the cables can be quick-disconnect-type connectors. Thus, the three switches (100A, 100B and 100C) can be interconnected in series as shown in FIG. 9 conveniently by coupling connector 894A of cable 890A with connector 894B1 of the splitter cable 890B; connector 894B2 of the splitter cable 890B with connector 894C1 of the splitter cable 890C; and connector 894C2 of the splitter cable 890C with a connector of the next switch or external circuitry (880). The detailed connections of individual wires of the connectors and splitters are shown in FIG. 10 according to another aspect of the disclosure.

Figure 11:
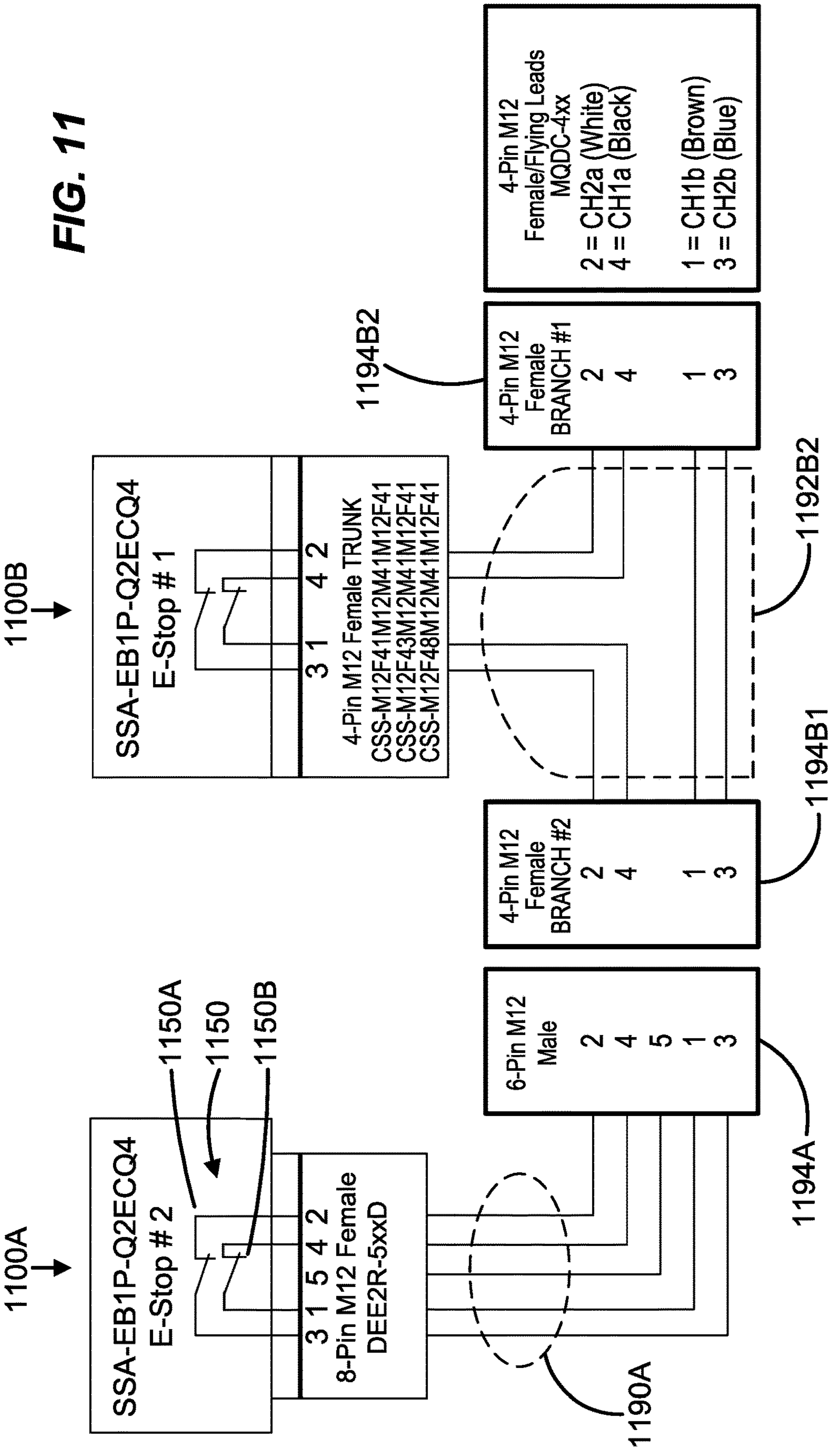
FIG. 11 schematically shows modular cables according an aspect of the disclosure and their connections to switches according to another aspect of the disclosure. In this example, the switches includes no indicator (illuminator) for the state of the pushbutton.

FIG. 11 schematically shows modular cables according an aspect of the disclosure and their connections to switches according to another aspect of the disclosure. In this example, the switches (1100A and 1100B) include no indicators (illuminating devices) for indicating the armed or actuated state of the switches. The electrical circuit inside each switch (1100A or 1100B) includes only contacts (1150), which in this example include multiple pairs of NC contacts (1150A and 1150B) for opening and closing external circuits. Due to the simpler circuitry of the switches (1150A and 1150B), modular cables having fewer conductive wires can be used. In this example, a five-wire cable 1190A with a five-pin connector 1194A, as well as a four-wire splitter cable with four-pin connectors (1194B1 and 1194B2) and four-wire splitter, can be used.

The operating principles of certain exemplary devices of this disclosure are also demonstrated by the use of a testing tool, such as the DBQEZLPTL Demo Box EZ Light Pick To Light Demo Box/Power supply, available from Banner Engineering Corp., Minneapolis, Minnesota. However, the applications of the switching device of the invention are not limited to use in connection with any such testing tools.

Thus, switches, such as pushbutton emergency stop switches, that include illumination logic intended for quick identification of the status (armed or actuated) of the individual emergency stop button and optional indication of a machine or system stop have been disclosed. The illumination feature of the pushbutton-type device according to certain aspects of the present disclosure enhances the ability to comply with the requirements to clearly identify emergency stop pushbutton device and for it to be clearly visible. The exemplary switches and combinations of switches facilitate high visibility, easy access and convenient safety system configuration.

Because many embodiments of the invention can be made without departing from the spirit and scope of the invention, the invention resides in the claims hereinafter appended.

We claim:

1. A switch, comprising:

a housing having a sidewall comprising an optical indicator portion having an externally visible annular illumination surface substantially surrounding, and facing away from, a longitudinal axis;

a switching module comprising an actuator adapted to be manually actuated to move relative to the housing along the longitudinal axis from a first position to a second position;

an internal circuit enclosed in the housing and comprising:

an illuminating device adapted to illuminate the externally visible annular illumination surface; and a plurality of pairs of contacts, at least a first one of the plurality of pairs of contacts being connectable to one or more circuits external to the housing and adapted to change an operational state of the one or more circuits when the actuator is manually actuated, and at least a second one of the plurality of pairs of contacts being connected to the illuminating device and adapted to cause the illuminating device to emit light of different states of illumination corresponding to the respective positions of the actuator;

wherein the first position is an armed position, at which the switching module permits the one or more circuits external to the housing to continue operation, and the second position is an actuated position, at which the switching module causes the one or more circuits external to the housing to cease operation.

2. The switch of claim 1, wherein the externally visible illumination surface comprises substantially an entire circumferential portion of an exterior portion of a cylindrical wall section of the housing.

3. A system, comprising a plurality of switches, each of which being the switch of claim 1, the plurality of switches being pairwise electrically connected to each other.

4. The system of claim 3, further comprising a control unit electrically connected to at least one of the plurality of switches and adapted to detect whether at least one of the plurality of pairs of contacts in the internal circuit of each of the plurality of switches is open or closed.

5. The switch of claim 1, the sidewall of the housing further comprising an opaque portion having a first lateral dimension transverse to the longitudinal axis, the externally visible annular illumination surface having a second lateral dimension transverse to the longitudinal axis, the second lateral dimension being greater than the first dimension.

6. The switch of claim 1, wherein the actuator comprises a push-button actuator disposed above a top portion of the housing, the armed position being further away from the top of the housing than the actuated position, the switch further comprising a mounting portion disposed below a bottom portion of the housing and adapted to secure the switch to a support surface, with the housing and push-button actuator positioned above the support surface.

7. The switch of claim 6, wherein the push-button actuator is adapted to be released from the actuated position and positioned in the armed position when twisted about the longitudinal axis.

8. The switch of claim 1, the internal circuit being adapted to cause the illuminating device to emit light of a first color when the actuator is in the armed position and to emit light of a second color when the actuator is in the actuated position.

9. The switch of claim 1, the sidewall of the housing having an upper portion and a lower portion, the actuator comprises a push-button actuator disposed above the upper portion of the housing, the armed position being further away from the upper portion of the housing than the actuated position, the sidewall of the housing further comprising an opaque portion and being substantially circularly symmetrical about the longitudinal axis.

10. The switch of claim 9, at least a portion of the sidewall of the housing having a frustoconical shape, the externally visible annular illumination surface being located in the lower portion of the sidewall of the housing.

11. The switch of claim 1, further comprising a connector electrically connected to the switch module and connectable to the one or more circuits external to the housing.

12. The switch of claim 9, the externally visible annular illumination surface being substantially an outer most surface away from the longitudinal axis.

13. The switch of claim 6, the mounting portion comprising a threaded cylindrical portion.

14. The switch of claim 7, the push-button actuator bearing a marking indicating a direction in which the push-button actuator is to be twisted to be released from the actuated position.

15. An emergency stop switch, comprising:

a housing having a sidewall comprising an optical indicator portion having an externally visible annular illumination surface substantially surrounding, and facing away from, a longitudinal axis;

an internal circuit enclosed in the housing and adapted to illuminate the externally visible annular illumination surface; and a switching module comprising a push-button actuator adapted to be manually actuated to move relative to the housing along the longitudinal axis between an armed position and an actuated position, and a plurality of pairs of electrical contacts enclosed in the housing, each pair switchable between a conducting state and a non-conducting state, the push-button actuator being adapted to switch each one of the plurality of pairs of contacts between the conducting and non-conducting states when the push-button actuator is moved from the armed position to the actuated position, at least one of the plurality of pairs of contacts of the switching module being connectable to one or more external circuits, the switching module being adapted to connect electrical power to the one or more external circuits when the actuator is manually moved to the armed position, and to interrupt electrical power to the one or more circuits when the actuator is manually moved to the actuated position, at least another one of plurality of pairs of contact of the switching module being connected to the internal circuit and adapted to cause the internal circuit to output light of different colors through the annular illumination surface depending on the longitudinal position of the push-button actuator.

16. The emergency stop switch of claim 15, further comprising:

a threaded mounting portion protruding from the housing and extending along the longitudinal axis, and adapted to secure the switch to a support; and an electrical connection passing through the threaded mounting portion and electrically connected to at least one of the plurality of pairs of contacts in the switch module, and adapted to be connected to the external circuit.

17. The emergency stop switch of claim 15, wherein the internal circuit is adapted to output light of a second color in the flashing manner indicative of an actuated state of the switch when the actuator is positioned in the actuated position.

18. The switch of claim 15, the sidewall of the housing having an upper portion and a lower portion, the push-button actuator being disposed above the upper portion of the sidewall, the armed position being further away from the upper portion of the housing than the actuated position, the sidewall of the housing further comprising an opaque portion and being substantially circularly symmetrical about the longitudinal axis.

19. The switch of claim 18, at least a portion of the sidewall of the housing having a frustoconical shape, the externally visible annular illumination surface being located in the lower portion of the sidewall of the housing.

20. The switch of claim 18, wherein the push-button actuator bears an indica of a direction of rotation about the longitudinal axis and is adapted to be released from the actuated position and positioned in the armed position when twisted about the longitudinal axis in the direction shown by the indicia.

* * * * *